3,127,942
BEARING CLOSURE FOR ROTARY ROCK BIT
William J. Neilson, Whittier, Calif., assignor to Smith Industries International, Inc., Compton, Calif., a corporation of California
Filed Jan. 2, 1962, Ser. No. 163,792
2 Claims. (Cl. 175—227)

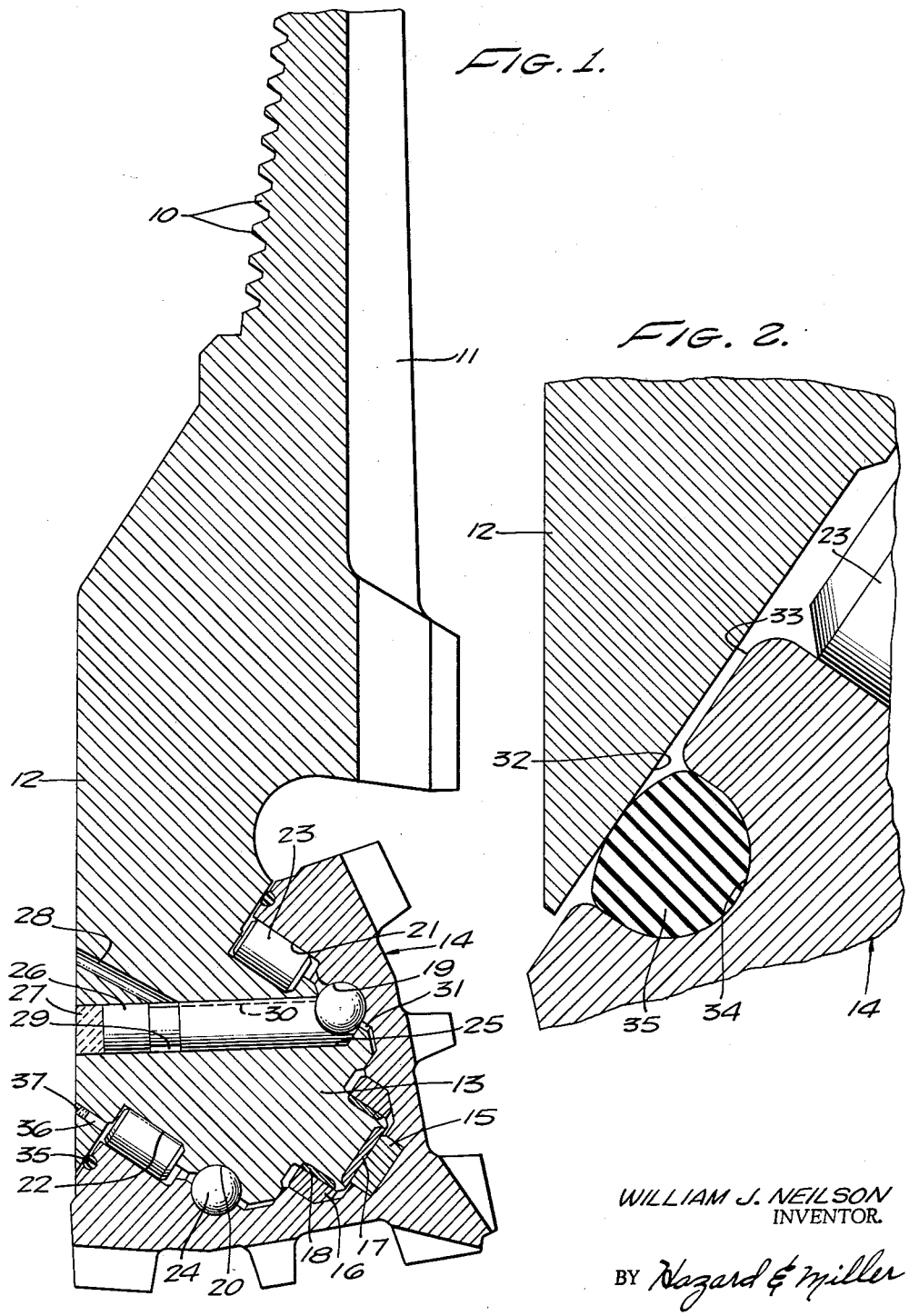

This invention relates to a bearing closure for rotary rock bits.

A primary object of the invention is to provide a simple, inexpensive closure which will retard, if not prevent the escape of lubricant between the cone or roller cutter and its journal of a rotary rock bit and which will also function as a means for preventing ingress of material to the bearing which would have a tendency to reduce its life.

Another object of the invention is to provide a rotary rock bit so designed that the bearings between the cone or roller cutter and the journal may be adequately supplied with lubricant prior to the time of use.

With the foregoing and other objects in view, which will be made manifest in the following detailed description and specifically pointed out in the appended claims, reference being had to the accompanying drawings for an illustrative embodiment of the invention, wherein:

FIGURE 1 is a vertical section through one leg of a rotary rock bit illustrating the cone or roller cutter in assembled relationship thereon and illustrating the present invention as having been incorporated therein; and FIG. 2 is a partial view in vertical section on a greatly enlarged scale illustrating a detail shown on FIG. 1.

Referring to the accompanying drawings wherein similar reference characters designate similar parts throughout, the invention has been illustrated as having been applied to a rotary rock bit of conventional design wherein the body of the bit is usually made up of three or more parts that are collectively assembled together and which are externally threaded at their upper ends as indicated at 10 for attachment to the drill collars of a well drilling string.

The interiors of these body parts may be shifted to provide a passage 11 for circulation fluid. Each body part provides a downwardly extending leg 12 on which is formed a downwardly and inwardly extending journal 13 on which the cone or roller cutter 14 is rotatable.

The particular design of cone or cutter is immaterial insofar as the present invention is concerned. However, in conformity with one conventional design the inner end of the cutter has a pad of hard metal 15 recessed therein and a ring of hard metal 16. Opposite the pad and and ring areas are hard-faced as indicated at 17 and 18, respectively, forming friction-type thrust and radial bearings between the cone and journal 13 near the smaller ends of the cone and journal.

Outwardly of these friction bearings there are opposed ball races 19 and 20 on the cone and journal, respectively, and outwardly of these ball races there are roller bearing races 21 and 22, respectively. In conformity with conventional practice the rollers 23 are applied prior to the slipping of the cone 14 onto the journal 13 in an axial direction. The balls 24 are fed into the space between their recesses through a ball hole 25 drilled or otherwise formed in the journal 13. After the balls have been inserted through the ball hole the ball hole is largely closed by a ball plug 26 which is retained in position by a weld 27.

An inlet passage 28 is formed in the leg 12 and communicates with an annular clearance or relief 29 formed on the ball plug. This in turn communicates with a longitudinal groove 30 formed on the ball plug that leads to the ball race 20 on the journal 13. Grease can be forced into passage 28, the clearance space 29, and through the groove 30 to fill the spaces between adjacent balls and rollers and to fill clearance spaces 31 that are left between the cutter or cone 14 and the journal.

The problem is to tend to confine the lubricant in the bearing between the cone or cutter and the journal and to prevent ingress of abrasive materials into the bearing which might shorten its life. In accordance with the present invention in one of the opposed faces 32 and 33 on the leg 12 and on the cutter 14, respectively, there is formed an annular groove 34. This groove is preferably formed in the outer face of the cone or cutter 14 and is largely filled by an endless O-ring 35 formed of rubber or rubber-like material. It is so proportioned that when the cone or cutter is axially slipped onto the journal 13 it is necessary to compress this O-ring and deform it slightly from its normal circular cross-sectional shape as illustrated in FIG. 2. With this arrangement, the O-ring frictionally remains stationary relative to the cone or cutter 14 but slides or turns relative to the face 32 formed on the leg 12 around the journal 13. Inwardly of the O-ring 35 and at a point remote from the location where groove 30 communicates with ball race 20 there is formed a bleed hole 36. This bleed hole is left open until the bearing has been lubricated and then is closed such as by a weld 37.

In assembling the bit the cutter or cone 14 is axially slipped onto the journal 13, the balls 24 are fed through the ball hole 25, and the ball plug 26 is then inserted and retained in place by its weld 27. Lubricant is forced under pressure through the inlet hole 28 and is conducted through the clearance space 29 and groove 30 to the bearing between the cone and the journal. Air between the rollers and balls and in the spaces 31 is expelled by the incoming lubricant through the bleed hole 36. When lubricant is finally discharged or appears in the bleed hole 36 indicating that the bearing has been completely filled the bleed hole 36 is then closed, such as by its weld 37. The presence of the O-ring 35 prevents or at least retards the escape of lubricant from the bearing between the opposed faces 32 and 33. It also serves to prevent ingress of abrasive materials between these faces to the bearing, thus materially prolonging the life of the bearing. Preferably, the entrance hole 28 is left open so that the pressure on the lubricant in the bearing and on one side of the O-ring 35 will be equal to the hydrostatic pressure on the exterior of the bit which is effective on the other side of the O-ring 35. As the bearing wears, a slight axial movement of the cone 14 relative to the journal 13 may occur. Such slight axial movements tend to increase and decrease the volumetric space between the cone and the journal so that an action known as "pumping" may occur. By leaving the hole 28 open this pumping is not conducive to expelling lubricant past the O-ring 35 or causing abrasive materials to be drawn into the bearing past the O-ring.

It will be appreciated that the present invention is of very simple and economical construction and may be applied to any conventional or preferred design of rock bit. When employed it not only assures that the bearing will be completely and adequately lubricated but ingress of foreign materials to the bearing is effectively prevented.

Various changes may be made in the details of construction without departing from the spirit and scope of the invention as defined by the appended claims.

I claim:
1. A well drilling bit having a body attachable to a drill string, a journal on the body, a cutter rotatable on the journal, a bearing between the journal and the cutter, a ball plug extending through the journal largely closing the aperture through which parts of the bearing were fed through the journal from the exterior of the body to be- tween the journal and cutter, said ball plug having a passage formed therein leading to the bearing, there being a first passage in the body leading from the exterior surface of the body adjacent the outer end of the ball plug to the passage in the ball plug through which lubricant can be forced into the bearing, an O-ring recessed in the outer end face of the cutter bearing against the body around the journal and around the bearing, there being a second passage formed in the body leading from the exterior surface of the body adjacent the outer end of the ball plug to the bearing at a point remote from where the passage in the ball plug discharges into the bearing and within the O-ring, and means closing the outer end of the second passage.

2. A well drilling bit having a body attachable to a drill string, a journal on the body, a cutter rotatable on the journal, a roller race on the outer end of the journal, a ball race on the journal disposed inwardly of the roller race, rollers between the roller race and the cutter, balls between the ball race and the cutter, there being an aperture in the body leading from the exterior thereof to the top of the ball race through which balls were fed to between the ball race and the cutter, a ball plug largely closing said aperture, means closing the outer end of said aperture, a first passage leading from the exterior surface of the body to said aperture through which lubricant can be supplied to the top of the ball race, there being a second passage in the body extending from the exterior thereof to the bottom of the roller race, sealing means recessed in the outer end face of the cutter sealing against the body around the rollers and the inner end of the second passage, and means closing the second passage.

References Cited in the file of this patent

UNITED STATES PATENTS

| | | |
|---|---|---|
| 1,136,134 | Hughes | Apr. 20, 1915 |
| 1,896,231 | Fletcher | Feb. 7, 1933 |
| 1,909,128 | Scott et al. | May 16, 1933 |
| 2,260,487 | Scott | Oct. 28, 1941 |
| 2,814,465 | Green | Nov. 26, 1957 |
| 2,861,780 | Butler | Nov. 25, 1958 |
| 2,906,504 | Parks | Sept. 29, 1959 |
| 3,007,751 | Eenink | Nov. 7, 1961 |
| 3,095,934 | Goetz | July 2, 1963 |

FOREIGN PATENTS

| | | |
|---|---|---|
| 1,260,080 | France | Mar. 27, 1961 |